United States Patent

Touhsaent et al.

[19]

[11] Patent Number: 5,827,615
[45] Date of Patent: Oct. 27, 1998

[54] METALLIZED MULTILAYER PACKAGING FILM

[75] Inventors: Robert E. Touhsaent, Fairport, N.Y.; M. Lawrence Tsai, Holmdel, N.J.

[73] Assignee: Mobil Oil Corporation, Fairfax, Va.

[21] Appl. No.: 680,758

[22] Filed: Jul. 15, 1996

[51] Int. Cl.⁶ .............. B32B 15/08; B32B 3/26; B32B 7/12; B32B 5/16

[52] U.S. Cl. .............. 428/463; 428/304.4; 428/327; 428/344; 428/349

[58] Field of Search .............. 428/463, 913, 428/304.4, 349, 344, 327

[56] References Cited

U.S. PATENT DOCUMENTS

| | | | |
|---|---|---|---|
| 3,433,777 | 3/1969 | Brunson | 260/88.2 |
| 4,198,327 | 4/1980 | Matsumoto et al. | 260/4 |
| 4,377,616 | 3/1983 | Ashcraft et al. | 428/213 |
| 4,632,869 | 12/1986 | Park et al. | 428/315.5 |
| 5,126,198 | 6/1992 | Schinkel et al. | 428/349 |
| 5,153,074 | 10/1992 | Migliorini | 428/463 |

*Primary Examiner*—William Krynski
*Assistant Examiner*—Cathy F. Lam
*Attorney, Agent, or Firm*—Jessica M. Sinnott; Dennis P. Santini

[57] ABSTRACT

A metallized film substrate having a core layer comprising a film-forming base polymer, a metal receiving skin layer of an ethylene vinyl alcohol copolymer (EVOH) on a surface of the core layer, the film substrate containing a metal deposit, e.g., aluminum, on the EVOH copolymer surface, and a polymeric low temperature sealable coating comprising a copolymer of about 10 to 35 wt. % of at least one $\alpha,\beta$-ethylenically unsaturated carboxylic acid with about 65 to 90 wt. % of ethylene, an alkyl acrylate or methacrylate, acrylonitrile, or mixtures thereof, on the surface of said metal deposit. For adhesion of the EVOH, the core layer may either (i) be blended with a maleic anhydride modified polyolefin or (ii) have an adhesion-promoting tie layer of a maleic anhydride-modified polyolefin on a surface which is in contact with the EVOH.

25 Claims, 1 Drawing Sheet

FILM CROSS SECTION
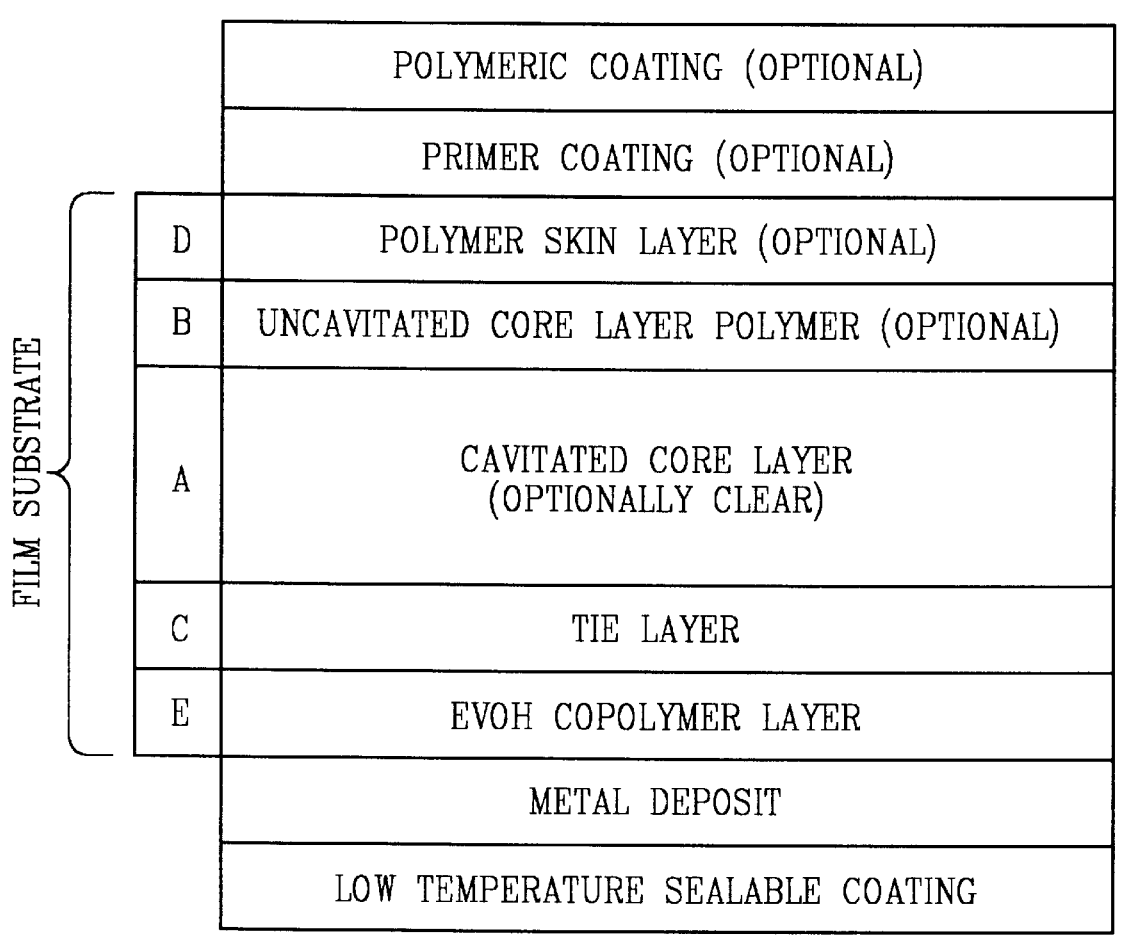

METALLIZED MULTILAYER PACKAGING FILM

BACKGROUND OF THE INVENTION

1. Field of the Invention

This invention relates to metallized multilayered films utilized in the packaging of food or non-food products or in the formation of bags, cartons or pouch-type containers designed to hold such products.

2. Background Information Including Description of Related Art

Metallized plastic films having a polyolefin core layer, e.g., of an oriented isotactic polypropylene homopolymer (OPP), have been widely utilized in food and non-food packaging and containers because of their desirable properties, i.e., resistance to the transmission of moisture, air, deleterious flavors and the like, as well as their excellent mechanical properties. However, a disadvantage of many of these films is the difficulty of covering the metal layer to protect the metal from scratches and obtaining high seal strength. Thus, any means sufficient to overcome these difficulties would allow for the production of metallized films much better suited for packaging applications.

The following references may be pertinent to the claimed invention.

U.S. Pat. No. 3,433,777, issued Mar. 18, 1969 to Brunson, discloses low viscosity amorphous polyolefins, e.g., polypropylene, reacted with an unsaturated polycarboxylic compound, e.g., maleic anhydride to produce emulsifiable modified polyolefins having good adhesion properties.

U.S. Pat. No. 4,198,327, issued Apr. 15, 1980 to Matsumoto et al., discloses crystalline polyolefins, e.g., polypropylene, modified by an unsaturated carboxylic acid or derivative, e.g., maleic anhydride, having improved adhesion to polar solid materials.

U.S. Pat. No. 4,377,616, issued Mar. 22, 1983 to Ashcraft et al., discloses an opaque, biaxially oriented polymeric film structure comprising a thermoplastic core matrix, e.g., of isotactic polypropylene, containing voids created by the inclusion within the matrix material of void-initiating solid particles e.g., of a polyester or nylon, which are incompatible with the matrix material, and void free transparent thermoplastic film skin layers, e.g., polypropylene adhering to the surface of the core matrix.

U.S. Pat. No. 4,632,869, issued Dec. 30, 1986 to Park et al., has a disclosure similar to that of U.S. Pat. No. 4,377,616 discussed in the preceding paragraph except that polybutylene terephthalate is specified as the material of the void-initiating solid particles.

U.S. Pat. No. 5,126,198, issued Jun. 30, 1992 to Schinkel et al., discloses heat-laminatable multilayer films comprising a polypropylene base layer and at least one additional layer containing a mixture of an ethylene/vinyl acetate copolymer and an ethylene/acrylic acid copolymer.

U.S. Pat. No. 5,153,074, issued Oct. 6, 1992 to Migliorini, discloses a metallized film combination comprising a polymer substrate, e.g., of oriented polypropylene, at least one surface of which has been modified by a maleic anhydride modified propylene homopolymer or copolymer, the latter surface having a skin layer of ethylene vinyl alcohol copolymer (EVOH) on which skin layer has been deposited a layer of aluminum. The maleic anhydride modified propylene homopolymer or copolymer may be intermixed with the polymer substrate or may be in the form of a separate skin layer on said substrate. A heat sealable film can be produced by coextruding an ethylene propylene copolymer or an ethylene propylene butene-1 terpolymer on the side of the substrate opposite to that of the EVOH layer.

In addition to the foregoing published references, the following pending applications may also be considered pertinent.

Application Ser. No. 08/051,120 filed Apr. 21, 1993 by Balloni et al., discloses metallized multilayer films comprising a void-containing oriented polypropylene core layer, a skin of maleic anhydride modified polypropylene on the surface of the core layer, a layer of ethylene vinyl alcohol copolymer (EVOH) on the modified polypropylene skin layer, a heat sealable or printable skin layer on the other surface of the core layer, and a metallization layer on the EVOH layer.

Application Ser. No. 08/054,991 filed Apr. 30, 1993 by Touhsaent, discloses polymer films, e.g., of oriented polypropylene coated with partially neutralized copolymers of ethylene and acrylic acid (EAA) or methacrylic acid (EMA).

SUMMARY OF THE INVENTION

In accordance with this invention, a metallized multilayered film suitable for packaging applications is provided comprising a film substrate having in cross-section a) a core layer comprising a film-forming base polymer, e.g., an isotactic polypropylene homopolymer, optionally blended with a maleic anhydride-modified polyolefin, e.g., polypropylene;

b) if said maleic anhydride-modified polyolefin is not blended with the base polymer of the core layer, an adhesion-promoting tie layer of said maleic anhydride-modified polyolefin on one surface of the core layer;

c) a metal receiving skin layer of an ethylene vinyl alcohol copolymer (EVOH) on a surface of the core layer containing said blended maleic anhydride-modified polyolefin or of said maleic anhydride-modified polyolefin tie layer;

d) optionally, on the other side of the core layer, a polymer skin layer having a lower melting temperature than that of the core layer such film substrate containing a metal deposit, e.g., of aluminum on the EVOH copolymer surface and a low temperature sealable coating (LTSC) comprising a copolymer of about 10 to 35 wt. % of an $\alpha,\beta$-ethylenically unsaturated carboxylic acid with about 65 to 90 wt. % of ethylene, an alkyl acrylate or methacrylate, acrylonitrile or a mixture thereof, deposited directly, i.e., without a primer, on the exposed surface of the metal layer. Optionally, the side of the film substrate opposite that containing the metal layer, either containing a skin layer of a polymer having a lower melting temperature than that of the core layer as mentioned previously, or in the absence of such skin layer, may contain a coating which may be a sealable coating, e.g., of the same type as that applied to the metal layer, or a different polymeric, film-forming coating of any of various types known in the art.

The term "core layer polymer" is intended to include the core layer alone if not blended with any other polymer or the core layer polymer blended with a minor amount of adhesion promoting maleic anhydride-modified polyolefin as described hereinafter.

Optionally, a printed ink pattern may be applied to the exposed surface of either the sealable coating on the metal layer, or the coated or uncoated surface on the other side of the film, with an overlacquer or cold seal coating applied to the surface containing the printed pattern to protect the pattern from damage. Also optionally, another film may be laminated to any surface of the metallized film which does not contain an overlacquer.

It has been found that the film of this invention is suitable for packaging applications where the metal layer is protected by a sealable coating with good metal adhesion and high seal strength.

BRIEF DESCRIPTION OF THE DRAWING

The drawing illustrates in schematic form the various layers in the cross section of a specific embodiment of a film of this invention as described in the foregoing Summary, and is self explanatory.

DETAILED DESCRIPTION OF THE INVENTION

The base polymer of the core layer of the film of this invention generally has mechanical properties considered necessary or desirable in the film. In many cases, such polymer is a polyolefin having a melting point, for example, of at least about 125° C. and up to for example, about 190° C., and a relatively high degree of crystallinity. A particularly desirable polyolefin as the base polymer the core layer is an isotactic polypropylene homopolymer which is, for example, about 93 to 99% isotactic and has a crystallinity of about 70 to 80%, and a melting point, for example, of about 145° C. or higher, e.g., up to about 167° C.

Another desirable base polymer suitable for the core layer of the film of this invention is a high density polyethylene (HDPE), which is a substantially linear polymer having a density, for example, of about 0.952 to 0.962 g/cc, a melting point of, for example, about 130° to 148° C. and a substantial degree of crystallinity.

If it is desired to produce a film which is opaque after being subjected to uniaxial or biaxial orientation as described hereinafter, microspheres may optionally be dispersed in the core layer polymer before extrusion and orientation of the film. Such microspheres are composed of a material higher melting than and immiscible with the core layer base polymer and the core layer may be any of those disclosed, for example, in previously cited U.S. Pat. Nos. 4,377,616 and 4,632,869, the entire disclosures of which are incorporated by reference. Thus, the microspheres may be composed of a polymer, e.g., a polyester such as polybutylene terephthalate (PBT) or polyethylene terephthalate (PET), a nylon, an acrylic resin, or polystyrene, or an inorganic material such as glass, metal or ceramic. The preferred material for the microspheres is PBT. The particle size of the microspheres may be, for example, about 0.1 to 10 microns, preferably about 0.75 to 2 microns. The microspheres may be present in the core layer in an amount of up to about 20 wt. %, preferably about 4 to 12 wet. % based on the total weight of the polymer matrix in the portion of the core layer containing the microspheres. To preserve the structural integrity of the microsphere-containing core layer, a thin layer of core layer polymer in the absence of microspheres may be coextruded on one or both sides of the microsphere-containing core layer polymer. In this case, the total of the microsphere-containing polymer layer and the non-microsphere-containing polymer layers may be considered the overall core layer of the film on one side of which is either a maleic anhydride-modified polyolefin tie layer if such modified polyolefin is not present in the core polymer, or an EVOH copolymer skin layer if such modified polyolefin is present in the core layer, and the other side of which optionally is a skin layer having a lower melting temperature than the core layer. When such a polymer substrate is subjected to uniaxial or biaxial orientation, a cavity forms around each microsphere giving the oriented film an opaque appearance.

The maleic anhydride-modified polyolefin, e.g., polypropylene, which is present in the core layer or in a skin layer on one side of the core layer may be prepared by any process, for example, that disclosed in previously cited U.S. Pat. Nos. 3,433,777 and 4,198,327, the entire disclosures of which are incorporated by reference. A commercially available maleic anhydride-modified polypropylene or propylene copolymer has the following physical characteristics: density 0.89–0.91 (ASTM D1505), Vicat softening point 100°–150° C. (ASTM D1525); Shore hardness 50–70 (ASTM D2240); melting point 140°–160° C. (ASTM D2117). It is essential to use a maleic anhydride-modified polyolefin in order to tie the core layer with the EVOH copolymer layer, the base polymer of the core layer and the EVOH copolymer being generally incompatible. If the maleic anhydride-modified polyolefin is blended with the base polymer of the core layer, it is generally present in an amount, for example, under about 10 wt. %, preferably about 0.5 to 1.5 wt. % based on the combined weight of base polymer and modified polyolefin.

The ethylene vinyl alcohol (EVOH) copolymer referred to herein can be obtained from any commercial source. For example, extrusion grade ethylene vinyl alcohol copolymer is available under the name EVAL from Kuraray Co. Ltd. of Japan. EVOH copolymer is conventionally prepared by saponifying ethylene vinyl acetate copolymer having a polymerized ethylene content of from about 20–70 mol % to a saponification degree of at least about 90%. Thus, the ethylene vinyl alcohol copolymer employed herein can have an ethylene content ranging from about 20–70 mol %.

The polymer of the optional skin layer on the side of the core layer opposite that of the EVOH copolymer layer is preferably an extrudable hydrocarbon polymer such as a polyolefin having a lower melting point, e.g., at least about 5° C. lower and up to about 50° C. lower, than the polymer of the core layer. Polymers falling within this category when the core layer base polymer is an isotactic polypropylene homopolymer are, for example, isotactic copolymers of propylene and a minor amount, e.g., about 1 to 10 wt. %, of one or more different 1-olefins, e.g., ethylene or a higher 1-olefin having, for example 4 to about 8 carbons atoms. Particularly suitable are isotactic copolymers of monomers consisting of propylene, ethylene in an amount of, for example 1 to 5 wt. % of the copolymer, and optionally, butylene in an amount, for example, of about 0.5 to 5 wt. % of the copolymer. Other polymers which can be used for the optional skin layer of the film substrate on the side of the core layer opposite that of the EVOH copolymer when the core layer base polymer is an isotactic polypropylene homopolymer are, for example, high density polyethylene (HDPE), and linear low density polyethylene (LLDPE). If the core layer base polymer is an HDPE, the polymer of such optional skin layer may be any of the polymers disclosed previously as suitable for such layers when the core layer base polymer is an isotactic polypropylene homopolymer except for HDPE itself, as long as the polymer has the requisite lower melting temperature than the HDPE making up the core layer.

The polymer substrate of the metallized film of this invention comprising a core layer, a tie layer if present, an EVOH copolymer layer and an optional skin layer on the side of the core layer opposite the EVOH copolymer layer and having a lower melting temperature than the core layer, is preferably prepared by coextruding the polymers of these layers. After such extrusion of the basic film substrate utilizing conventional extrusion techniques, the film is heated and molecularly oriented in the longitudinal, i.e., machine, direction and optionally in the transverse direction. This uniaxial or biaxial orientation, which greatly improves the stiffness and tensile strength properties of the film, is accomplished by utilizing conventional techniques to stretch sequentially the film, for example, about three to eight times in the machine direction and optionally, five to twelve times in the transverse direction, at a drawing temperature of about 100° to 200° C. In most cases, a coextruded film having a core layer base polymer of an isotactic polypropylene homopolymer would be biaxially oriented, while a film having a core layer base polymer of HDPE would be uniaxially oriented, i.e., only in the machine direction.

For some purposes, it may be desirable to produce the polymer substrate comprising the core and skin layers, and tie layer, if used, by a cast film or chill roll extrusion process rather than a coextrusion and orientation process. In this case, the final polymer substrate is essentially unoriented and the final metallized film is generally much less stiff than films in which the substrate is prepared by a coextrusion and orientation process.

Before applying the metal, primer or polymeric, film-forming coatings to the surfaces of the film substrate, as described hereinafter, the EVOH copolymer surface and the opposite surface are optionally treated to insure that the coatings will be strongly adherent to the film substrate, thereby eliminating the possibility of the coatings peeling or being stripped from the film. This treatment can be accomplished by employing known prior art techniques such as for example, film chlorination, i.e., exposure of the film to gaseous chlorine, treatment with oxidizing agents such as chromic acid, hot air or steam treatment, flame treatment, corona discharge treatment, and the like. Flame or corona discharge treatment of the surfaces is preferred in the production of the films of this invention.

In general, an uncoated and optionally surface treated film substrate produced by a coextrusion and orientation process has a thickness, for example, of about 0.5 to 3.0 mils. Of particular interest are two to four layer films wherein the cavitated or uncavitated core layer has a thickness, for example, of about 70 to 99% of the total thickness of the film and the one or two skin layers and tie layer, if used, each has a thickness of, for example, about 1 to 10% of the total thickness of the film. If more than one layer other than the core layer are present, their thicknesses may be the same or different.

The uncoated, oriented and optionally, surface treated film substrate may have a total thickness, for example, of about 0.5 to 3.0 mils, wherein the cavitated or uncavitated core layer has a thickness, for example, of about 75 to 99% of the total film thickness, the maleic anhydride modified polyolefin tie layer, if used, has a thickness of, for example, about 0.5 to 5% of the total film thickness, the EVOH metallizable layer has a thickness of, for example, about 1 to 20% of the total film thickness, and the optional skin layer of polymer having a lower melting temperature than the core layer polymer present on the other side of the core layer has a thickness of, for example, about 1 to 10% of the total film thickness.

Application of a metal coating to the EVOH surface of the oriented film substrate is usually accomplished by conventional vacuum deposition although other metallization techniques known in the art such as electroplating or sputtering may also be used. Aluminum is preferred as the metal utilized for this purpose although other metals capable of being vacuum deposited such as gold, zinc, copper, silver and others known in the art may also be utilized for certain purposes. The thickness of the deposited metal coating may be, for example, about 5 to 200 nanometers (nm), preferably about 30 to 80 nm.

As stated, a low temperature sealable coating (LTSC) is applied to the metallized surface of the film without a primer, such coating comprising a base copolymer of about 10 to 35 wt. % of an $\alpha,\beta$-ethylenically unsaturated carboxylic acid, with about 65 to 90 wt. % of ethylene, an alkyl acrylate or methacrylate, acrylonitrile, or mixtures thereof. The latter unsaturated acid may be, for example, acrylic acid, methacrylic acid, maleic acid, crotonic acid, itaconic acid, citraconic acid, or mixtures thereof. Preferably, the base copolymer is a copolymer of about 65 to 90 wt. %, more preferably about 75 to 85 wt. % of ethylene, and about 10 to 35 wt. %, preferably about 15 to 25 wt. % of acrylic acid (an EAA copolymer) or methacrylic acid (an EMA copolymer). The copolymer may have a number average molecular weight (Mn) of, for example, about 2,000 to 50,000, preferably about 4,000 to 10,000.

The base carboxylic acid copolymer in the low temperature sealable coating applied to the metallized surface is often obtained as a solution or fine dispersion of an ammonium salt of the copolymer in an ammoniacal water solution. When the copolymer is dried, ammonia is given off and the ionized and water sensitive carboxylate groups are converted to largely unionized and less water sensitive free carboxyl groups. In practicing this invention, however, there may be added to the solution or dispersion of the ethylene copolymer an amount of ions of at least one metal from Group Ia, IIa or IIb of the Periodic Table, preferably, sodium, potassium, lithium, calcium or zinc ions, and most preferably sodium ions, e.g., in the form of their hydroxides. The quantity of such metallic ions may be in the range sufficient to neutralize, for example, about 2 to 80%, preferably about 10 to 50% of the total carboxylate groups in the copolymer. The presence of such metal ions has been found in many cases to result in an improvement in certain properties, e.g., coefficient of friction (COF), hot tack, and blocking, without an unacceptable sacrifice of other properties, e.g., low minimum seal temperatures (MST).

When the base copolymer in the sealable coating applied to the metallized surface is an EAA copolymer of 80 wt. % of ethylene and 20 wt. % of acrylic acid and the neutralizing metal ions are sodium ions added as sodium hydroxide, then the amount of sodium hydroxide added corresponding to the foregoing percentages of carboxylate groups neutralized, may be, for example, about 0.33 to 8.8 phr, preferably about 1.1 to 5.5 phr, where "phr" stands for parts by weight per hundred parts of the total resin, which is the same as the EAA copolymer when no other resin is present. For the purpose of determining the phr of various additives present in the coating, all the carboxylate groups of the ethylene copolymer are assumed to be in their free carboxyl (—COOH) form.

In addition to the carboxylic acid-containing base copolymer, the sealable coating applied to the metallized surface may also contain a dispersed wax, e.g., a relatively large particle size carnauba or microcrystalline wax as an anti-blocking agent. Other waxes which may be used are, for example, natural waxes such as paraffin wax, beeswax, japan wax, montan wax, etc., and synthetic waxes such as hydrogenated castor oil, chlorinated hydrocarbon waxes, long chain fatty acid amides, etc. The wax may be present in the coating in an amount of, for example, about 2 to 12 phr, preferably about 3 to 5 phr.

In addition to functioning as an anti-blocking material, the wax when incorporated into the coatings of the present invention also functions to improve the "cold-slip" properties of the films coated therewith, i.e., the ability of a film to satisfactorily slide across surfaces at about room temperature.

The sealable coating applied to the metallized surface of the film may also contain a particulate material, e.g., an amorphous silica, for the purpose of further reducing the tack of the coating at room temperature. Amorphous silica is composed of particles which are agglomerations of smaller particles and which have an average particle size of, for example, about 2 to 9 microns, preferably about 3 to 5 microns, and may be present in the sealable coating in an amount, for example, of about 0.1 to 2.0 phr, preferably about 0.2 to 0.4 phr.

Other optional additives which may be included in the sealable coating applied to the metallized surface of the film include other particulate materials such as talc which may be present in an amount, for example, of about 0 to 2 phr, cross-linking agents such as melamine formaldehyde resins which may be present in an amount, for example, of 0 to 20 phr, and anti-static agents such as poly(oxyethylene) sorbitan monooleate which may be present in an amount, for example, of about 0 to 6 phr. An anti-bacterial agent may also be present.

In addition to the low temperature sealable coating on the metallized surface of the film as previously described, a polymeric, film-forming coating may optionally be applied to the surface of the film opposite the metallized surface. However, to ensure adherence of this coating to such opposite surface of the film substrate, a coating of primer is first applied to such surface, either after the skin layer on such surface is treated to increase further its adhesiveness to other materials, e.g., by corona discharge or flame treating, or in the absence of such treatment. Primer materials which are suitable are well known in the art and include, for example, titanates, poly(ethyleneimine), and reaction products of an epoxy resin and an aminoethylated vinyl polymer. The primer is applied to the treated surface of the film substrate by conventional solution coating means. A particularly effective primer herein is poly(ethylene imine) applied as either an aqueous or organic solvent e.g., ethanol, solution, or as a solution in a mixture of water and organic solvent, containing about 0.5 wt. % of the imine.

The coating applied to the primer-containing surface of the film opposite the metallized surface may be a sealable coating of the same type as that applied to the metallized surface or it may be any of other types of polymeric, film-forming coatings known in the art, e.g., for improved printability or machinability. A particularly suitable coating is one containing as a film-forming component an terpolymer of 1) about 18 to 80 wt. % of at least one $C_1$–$C_4$ alkyl methacrylate, 2) about 18 to 80 wt. % of at least one $C_1$–$C_4$ alkyl acrylate, and 3) about 1 to 15 wt. % of at least one $\alpha,\beta$-ethylenically unsaturated carboxylic acid based on the weight of the polymer (an "acrylic terpolymer"); and colloidal silica as a hot slip agent in an amount, for example of about 30 to 60 phr and having a particle size of, for example, about 10 to 200 millimicrons. The unsaturated acid of the acrylic terpolymer may be any of those disclosed previously as suitable for the copolymer in the low temperature sealable coating applied to the metallized surface of the film, although acrylic and/or methacrylic acid are preferred. The copolymer may be utilized in the coating composition as a partially neutralized aqueous solution or as a dispersion, i.e., a latex. Additives may be present in the coating compositions which are the same or similar in nature and amount as those disclosed previously as suitable in the low temperature sealable coating applied to the metallized surface of the film, particularly a wax such as carnauba wax which functions as an antiblocking and cold slip agent, and talc which acts as a lubricant. This type of composition is disclosed, for example, in U.S. Pat. Nos. 3,753,769 and 4,749,616, the entire disclosures of which are incorporated herein by reference.

Another type of polymeric coating which may be applied to the surface of the film opposite the metallized surface in conjunction with a primer is a coating in which the film-forming component is a polymer of at least about 50 wt. % of vinylidine chloride, preferably about 75 to 92 wt. % of vinylidine chloride, 2 to 6 wt. % of an $\alpha,\beta$-ethylenically unsaturated acid such as any of those disclosed previously as suitable for the copolymers in sealable coatings and the remainder a $C_1$–$C_4$ alkyl acrylate or methacrylate, or acrylonitrile. Additives the same or similar to those disclosed previously in other coatings may also be present in these coatings. The vinylidine chloride copolymer may be utilized as a partially neutralized aqueous solution or as an aqueous dispersion, i.e., a latex. This type of coating is disclosed, for example, in U.S. Pat. No. 4,944,990, the entire disclosure of which is incorporated by reference.

The contemplated low temperature sealable coating (LTSC) composition is applied to the metallized surface of the polymer film, and, if used, the primer and polymeric coatings to the opposite surface, in any suitable manner such as by gravure coating, roll coating, dipping, spraying, etc. The excess aqueous solution can be removed by squeeze rolls, doctor knives, etc. The coating compositions will ordinarily be applied in such an amount that there will be deposited following drying, a smooth, evenly distributed layer of from about 0.2 to about 1 gram/1000 sq. in. of film surface. In general, the thickness of the applied LTSC is such that it is sufficient to impart the desired sealability, coefficient of friction (COF), and hot slip characteristics to the substrate polymer film.

The LTSC and other polymeric film-forming coating, if used, once applied to the film are subsequently dried by hot air, radiant heat or by any other suitable means thereby providing a non-water soluble, adherent, glossy coated film product useful, for example, as a packaging film.

A printed ink pattern may be applied to the coating on either surface of the film, or to the uncoated surface opposite the metallized surface if no coating is applied to such opposite surface, using, for example a conventional solvent-based ink composition. The printed pattern may be covered with an overlacquer to prevent the pattern from damage. The overlacquer may cover the entire surface containing the printed pattern, in which case sealing is accomplished solely by the softening of the coating or a polymer skin layer on the opposite surface of the film on the portion of the film constituting the outer film of the seal. However, if an "in to out" seal is also desired wherein sealing is also accomplished by the softening of the coating or polymer skin layer on the surface containing the printed ink pattern, a portion of which constitutes the inner film of the seal, then the printing and overlacquering is done in a pattern to allow the coating or polymer skin layer to be exposed in the sealing region.

Optionally, another film (the "laminating film") may be laminated to a surface of the metallized film of this invention, to which an overlacquer has not been applied, for the purpose of improving the mechanical properties, e.g., tear strength, and machinability, increasing the stiffness, protecting the printed pattern and/or providing hermetic seals of the metallized film. Thus, the laminating film may be bonded to a sealable coating on either the metallized surface or the opposite surface of the film of this invention, either after a printed pattern has been applied to the sealable coating or in the absence of such printed pattern, or the bonding of the laminated film may be to said opposite surface in the absence of any sealable coating. The laminating film may, for example, comprise a polymer having superior mechanical properties, e.g., isotactic polypropylene homopolymer, which is bonded to the film of the invention using as an adhesive molten polymer having a lower melting point than the laminating polymer, e.g., low density polyethylene (LDPE), or the laminating film may comprise a major layer of such polymer of superior mechanical properties and a minor layer of a polymer having a lower melting temperature than the polymer of the major layer, with the lamination being accomplished by pressing the surface of the laminating film containing such minor layer against the desired surface of the metallized film of the invention at a temperature high enough to render tacky the polymer of the minor layer. The methods and equipment necessary to accomplish the described bonding are well-known in the art.

The following examples further illustrate the invention.

COMPARATIVE EXAMPLE A

A four layer biaxially oriented film was prepared by coextruding a primary isotactic polypropylene homopolymer core layer base polymer matrix (with a melt flow of 3.0) blended with about 8 wt. % polybutylene terephthalate (PBT) microspheres to create voids within the polypropylene matrix, a metal receiving surface layer of EVOH (ethylene vinyl alcohol copolymer) with 48 mol % ethylene content, between the metal receiving EVOH layer and the core layer, an adhesion promoting tie layer of maleic anhydride modified polypropylene (with a melt flow of 3.0), and a surface layer of heat sealable resin on the other side of the core layer composed of a terpolymer of 2 wt. % ethylene, 94 wt. % propylene, and 4 wt. % butene-1. The coextrudate was quenched at 30°–50° C., reheated to 115° C. and stretched in the machine direction 5 times using transport rolls operating at different speeds. After the desired machine direction orientation, the film was transversely stretch oriented 8 times, at an appropriate temperature profile ranging rom 155°–180° C.

The resulting film had an overall optical gauge of 1.4 mil with a core layer of 1.27 mil optical gauge, an EVOH layer of 0.06 mil, an adhesion promoting tie layer of 0.02 mil and on the opposite side of the core layer, a heat sealable layer of 0.05 mil. Subsequently the metal receiving EVOH surface layer was treated with flame or corona treatment and metallized by vacuum deposition of aluminum.

EXAMPLE 1

A low temperature sealable coating (LTSC) composition is prepared by adding to an aqueous solution or fine dispersion of 25 wt. % of an ammonium salt of a copolymer of 80 wt. % of ethylene and 20 wt. % of acrylic acid (EAA), sold by Michelman as Primacor 4983, 1.5 phr (parts by weight per hundred parts of the copolymer) of sodium hydroxide (NaOH), 2 phr of poly(oxymethylene) sorbitan monooleate anti-static agent, sold as Glycosperse 0–20, 7 phr of microcrystalline wax having an average size of about 0.12 to 0.2 microns sold by Michelman as 41540, and 3 phr of melamine-formaldehyde cross-linking agent sold as Cymel 385. In addition, 0.4 phr of talc and 0.1 phr of amorphous silica having an average particle size of about 3 to 5 microns sold as Syloid 72 are also added to the composition. All the components are added as an aqueous dispersion or solution except the anti-static agent which is added as a pure liquid. Water is then added to bring the final coating composition to a solids content of about 12 wt. %.

The coating composition is then applied to the metallized surface of the film of Comparative Example A in the absence of a primer using standard gravure and coating apparatus and techniques, and the coating was dried at 240° F. The total coating weight was from about 0.6 to 0.7 gram/1,000 in$^2$ of film.

COMPARATIVE EXAMPLE B

The procedure of Example 1 was followed except that in place of the described EEA coating, the metallized surface of the film of Comparative Example A was coated with a composition comprising an aqueous dispersion or solution of an acrylic terpolymer of methyl methacrylate, ethyl acrylate and methacrylic acid, colloidal silica, and carnauba wax, with a total solids content of about 13 wt. %, as described in U.S. Pat. No. 2,753,769, to a coating weight of about 0.6 gm/1000 in$^2$ of film, using standard gravure coating apparatus and techniques and a drying temperature of 240° C.

The film of Example 1 produced in accordance with this invention, and those of Comparative Examples A and B were tested for Water Vapor Transmission Rate (WVTR) in g/100 in$^2$/day, measured at 100° F. and 90% R.H., Oxygen Transmission Rate (OTR) in cc/100 in$^2$/day measured at 73° F. and 0% R.H., coating to coating Minimum Seal (200 g/in) Temperature (MST) in degrees F measured in ESM, (please identify) and coating to coating Seal Strength in g/in. The results are shown in the following table.

TABLE I

| Example | WVTR | OTR | MST | Seal Strength |
| --- | --- | --- | --- | --- |
| A | 0.015 | 0.03 | >300 | None |
| 1 | 0.022 | 0.05 | 190 | 400 |
| B | 0.020 | 0.05 | >300 | <180 |

The results shown in the table indicate that the metallized film in accordance with this invention (Example 1) has barrier properties (WVTR and OTR) comparable to those of similar metallized films containing an EVOH layer except that they either have no coating on the metal layer (Comparative Example A) or have another coating known in the art in place of the LTSC of the invention (Comparative Example B). At the same time, however, the results show that the films in accordance with this invention (Example 1) have sealing properties (MST and Seal Strength) much superior to those of the films of Comparative Examples A and B. Furthermore, unlike the film of Comparative Example A, the film of Example 1 under the invention is suitable for single web packaging applications.

EXAMPLE 2

A five layer film substrate is co-extruded with a core layer of an isotactic polypropylene homopolymer sold as Exxon 4252 cavitated with 5 wt. % of Celanese 1300A polybutylene terephthalate (PBT) microspheres, with one surface of the cavitated core layer adjacent to a thin layer of the same polypropylene homopolymer which is uncavitated, which in turn is adjacent to a surface skin layer of an isotactic copolymer of about 96.5 wt. % of propylene with about 3.5 wt. % of ethylene sold as Fina 8753. The other surface of the cavitated core layer is adjacent to a tie layer of maleic anhydride grafted polypropylene sold as Mitsui QF500A which is in turn adjacent to a surface skin layer of a polymer blend of about 99 wt. % of a copolymer of about 48 mol % of ethylene and about 52 mol % of vinyl alcohol (EVOH) and about 1 wt. % of a fluoropolymer sold as 3M Dynamar PPA 2231 to prevent melt disturbance from dye build up.

The coextrudate was quenched at 30°–50° C., reheated to 115° C. and stretched in the machine direction 5 times using transport rolls operating at different speeds. After the desired machine direction, the film was transversely stretch oriented 8 times, at an appropriate temperature profile ranging from 155°–180° C.

Referring to the drawing, the resulting film substrate had an overall optical thickness of 2.13 mils with a cavitated oriented polypropylene (OPP) core layer of 2.0 mils. (layer A), an uncavitated OPP layer of 4 ga. (gauge, 1/100 mil), (layer B), a propylene-ethylene copolymer skin layer of 3 ga., (layer D), a maleic anhydride grafted polypropylene tie layer of 4 ga. (layer C) and an EVOH copolymer surface skin layer of 3 ga. (layer E). Subsequently, both the EVOH copolymer and propylene-ethylene copolymer skin layers were corona discharge treated and the EVOH layer was metallized by vacuum deposition of aluminum under standard conditions for high barrier aluminum metallizing to an optical density of about 2.3. The metallized surface of the film was then coated with a LTSC comprising an EAA copolymer as described in Example 1.

The corona discharge treated surface of the film substrate opposite the metallized surface, which contains a skin layer of a propylene-ethylene copolymer (layer D), was first primed with a 0.5 wt. % solution of poly(ethyleneimine) in a mixture of 85 percent water and 15 percent ethanol. The primed surface was then coated with a composition comprising an aqueous dispersion or solution of an acrylic terpolymer substantially similar to that applied to the metallized surface of the film in Comparative Example B. Coating conditions were 125 FPM, priming at 130° F. and coating at 150° F.

The coated film of this example was tested for Water Vapor Transmission Rate (WVTR) in g/100 in$^2$/day measured at 100° F. and 90% R.H., Oxygen Transmission Rate (OTR) in cc/100 in$^2$/day measured at 73° F. and 0% R.H., crimp seal strength (CRIMP) of metallized layer E at 20 psi, 0.75 sec. and 170, 200 and 260° F., and flat seal strength (SS) of metallized layer E at 5 psi, 0.75 sec. and various temperatures from 200° to 280° F. The values of these properties obtained are shown in Table II.

TABLE II

| Test | Result |
| --- | --- |
| WVTR | 0.011 |
| OTR | 0.017 |
| CRIMP - 170° F. | 578 |
| CRIMP - 200° F. | 505 |
| CRIMP - 260° F. | 585 |
| SS - 200° F. | 525 |
| SS - 210° F. | 550 |
| SS - 220° F. | 585 |
| SS - 230° F. | 535 |
| SS - 240° F. | 570 |
| SS - 260° F. | 570 |
| SS - 280° F. | 610 |

As can be seen in the foregoing table, excellent barrier and sealability properties were produced in a single film. This structure can be used to replace the paper/poly/foil/poly structure by itself or in laminations to provide a stiffer film with locked in print or a thicker sealant layer.

We claim:

1. A metallized multilayer film comprising a film substrate having in cross-section
    a) a core layer comprising a film-forming base polymer optionally blended with a maleic anhydride-modified polyolefin;
    b) if said maleic anhydride-modified polyolefin is not blended with said base polymer, an adhesion-promoting tie layer of a maleic anhydride modified polyolefin on one surface of the core layer;
    c) a metal receiving skin layer of an ethylene vinyl alcohol copolymer (EVOH) on a surface either of the core layer containing such blended maleic anhydride-modified polyolefin, or that of said maleic anhydride-modified polyolefin tie layer;
    d) Optionally, on the other side of the core layer, a polymer skin layer having a lower melting temperature than that of said the core layer
said film substrate containing a metal deposit on the surface of said metal receiving EVOH copolymer layer, and a polymeric low temperature sealable coating (LTSC) comprising a copolymer of about 10 to 35 wt. % of at least one α,β-ethylenically unsaturated carboxylic acid with about 65 to 90 wt. % of ethylene, an alkyl acrylate or methacrylate, acrylonitrile, or mixtures thereof, on the surface of said metal deposit.

2. The film of claim 1 wherein said base polymer of the core layer is an isotactic polypropylene homopolymer.

3. The film of claim 1 wherein said maleic anhydride-modified polyolefin is a maleic anhydride-modified polypropylene.

4. The film of claim 1 wherein said ethylene vinyl alcohol (EVOH) copolymer has a polymerized ethylene content of about 20 to 70 mol %.

5. The film of claim 1 containing said polymer skin layer on the side of the core layer opposite that of said EVOH copolymer layer.

6. The film of claim 5 wherein said polymer skin layer on the side of the core layer opposite that of said EVOH copolymer layer is an isotactic hydrocarbon copolymer of propylene and ethylene or an isotactic terpolymer of propylene, ethylene and butene-1.

7. The film of claim 6 wherein said hydrocarbon copolymer or terpolymer is a polymer of about 70 to 98 wt. % propylene, about 1 to 15 wt. % of ethylene, and about 0 to 15 wt. % of butene-1.

8. The film of claim 1 wherein said film substrate has been coextruded and biaxially or uniaxially oriented.

9. The film of claim 1 wherein said base polymer of said core layer contains voids produced by the stretch orientation of said base polymer containing microspheres of a material higher melting and immiscible with the base polymer.

10. The film of claim 9 wherein said microsphere material is polybutylene terephthalate (PBT).

11. The film of claim 9 wherein said core layer comprises a thin uncavitated layer adjacent to the surface of the cavitated portion of the core layer opposite that of the EVOH copolymer layer.

12. The film of claim 1 wherein the surface of said EVOH copolymer layer has been treated to increase its adherence to other materials.

13. The film of claim 12 wherein said treatment is a corona discharge or flame treatment.

14. The film of claim 1 wherein said metal deposit is aluminum.

15. The film of claim 1 wherein said LTSC copolymer is a copolymer of ethylene and acrylic acid (EAA copolymer) or methacrylic acid (EMA copolymer) in which about 2 to 80% of the carboxylate groups are neutralized with metal ions from Groups Ia, IIa or IIb of the Periodic Table.

16. The film of claim 15 wherein said EAA or EMA copolymer is a copolymer of about 75 to 85 wt. % of ethylene and 15 to 25 wt. % of acrylic or methacrylic acid, in which about 10 to 50% of the carboxylate groups are neutralized with sodium, potassium, calcium or zinc ions.

17. The film of claim 15 wherein said EAA or EMA copolymer is a copolymer of ethylene and acrylic acid.

18. The film of claim 16 wherein said carboxylate groups are neutralized with sodium ions.

19. The film of claim 1 wherein the surface of the film opposite that containing said metal deposit contains a polymeric coating deposited thereon.

20. The film of claim 19 wherein said coating on the surface opposite that containing the metal deposit comprises a terpolymer of 1) about 18 to 80 wt. % of at least one $C_1$–$C_4$ alkyl methacrylate, 2) about 18 to 80 wt. % of at least one $C_1$–$C_4$ alkyl acrylate, and 3) about 1 to 15 wt. % of at least one $\alpha,\beta$-ethylenically unsaturated carboxylic acid based on the weight of the terpolymer and colloidal silica as a hot slip agent.

21. The film of claim 20 wherein said terpolymer is a terpolymer of methyl acrylate, methyl methacrylate and methyacrylic acid.

22. The film of claim 19 wherein said coating on the surface opposite that containing the metal deposit is deposited directly on a primer coating which is deposited directly on the film substrate.

23. The film of claim 17 wherein said primer coating comprises polyethyleneimine.

24. The film of claim 8 wherein said oriented film substrate without the coating has a thickness of about 0.5 to 3 mils.

25. The film of claim 24 wherein said oriented film substrate has a core layer which is about 75 to 99% of the total thickness of the oriented film substrate, a tie layer which is about 0.5 to 5% of the total film thickness of the oriented film substrate, an EVOH layer which is about 1 to 20% of the total film thickness of the oriented film substrate and a polymer skin layer opposite the EVOH copolymer skin layer which is about 1 to 10% of the total film thickness.

* * * * *